United States Patent Office 2,939,004
Patented May 31, 1960

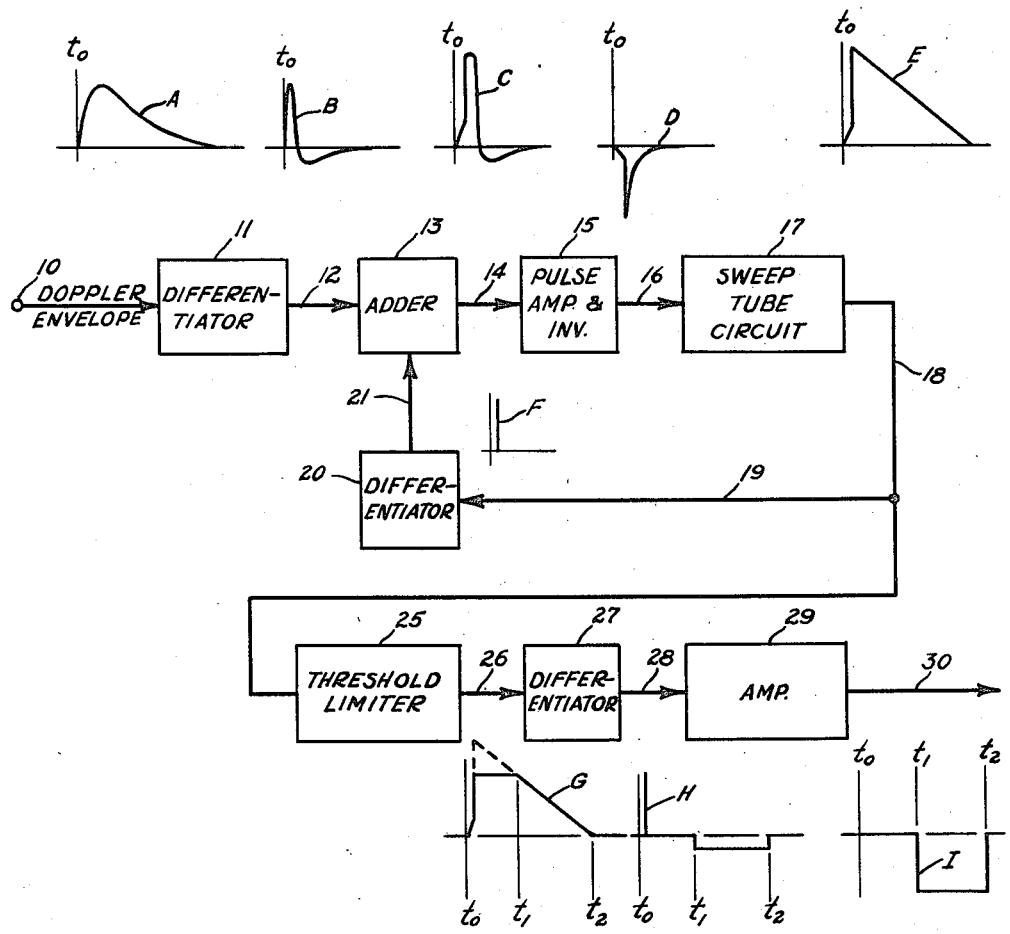

2,939,004

ELECTRONIC TIMING CIRCUIT

Benjamin R. Cole, Arlington, and Edward J. Sheldon, Jr., Lexington, Mass., assignors, by mesne assignments, to the United States of America as represented by the Secretary of the Navy Filed Dec. 31, 1958, Ser. No. 784,410

5 Claims. (Cl. 250—27)

This invention relates to electronic timing circuits and more particularly to the means and method of utilizing voltage pulse envelopes to produce corresponding controlled pulses delayed a predetermined time interval after each voltage pulse envelope. This invention relates still more particularly to the means of utilizing radar emergence signals of projectiles to produce corresponding delayed pulses from controlled portions of linear sweep voltages to effect voltage control of circuitry to switch Doppler radar for speed measurements in a prescribed range after projectile emergence.

While electronic timing circuits are well known in the art and provide successful operation for most purposes, such timing circuits have their time base maturing from a resistance-capacitance or RC network to provide a constant to establish signal delay, and the accuracy and dependability thereof rests upon the quality of the RC components and the regulation of the voltage charging circuits therefor. Any deviation in the RC components or in the voltage regulation of the charging circuits may materially change the time constant of such electronic delay circuitry.

In the present invention a voltage sweep tube circuit, for which a Miller type sweep circuit is suitable, is used to provide a negative-going linear voltage sweep which has the threshold voltage limited, clamped, or clipped at some point along the voltage sweep to determine a period of delay from the initial point of the sweep and of the time duration along this voltage sweep. Each linear voltage sweep is initiated by a pulse signal, such as a Doppler voltage signal, that is differentiated to provide an initiating or triggering pulse for the voltage sweep circuit. To increase the sensitivity of the voltage sweep circuit, the output of the voltage sweep circuit is differentiated in a feedback circuit to the differentiated Doppler input circuit to provide a regeneration of the initiating or triggering pulse for a sharp threshold voltage of the sweep circuit. The threshold voltage of the linear voltage sweep produced by the voltage sweep circuit is limited, clipped, or clamped in amplitude in accordance with the desired delay of the output voltage pulse to cause a portion of the linear voltage sweep of the voltage sweep circuit to be eliminated. The remaining linear voltage sweep is differentiated, producing a square wave in exact time relation to the remaining linear voltage sweep, which square wave may be amplified and utilized to trigger further circuitry or operate relay circuitry for a time duration delayed from an initiating Doppler pulse, or other signal. While this invention is particularly described and referred to with reference to Doppler emergence initiating pulses, it is to be understood that other input pulses may be used to develop time delayed pulses of predetermined time duration. For the purpose of simplicity in the description of the invention, an initiating pulse, such as a Doppler pulse, is shown and described in the environment of determining the speed of rapidly moving objects, such as projectiles, including missiles or bullets, in a certain specified time following the emergence of such projectiles. The circuit of this invention therefore makes it possible, in combination with other circuitry, to compute the speed of a projectile for a predetermined period of time, for example, at a time when such projectile is in the range of five feet to twenty feet from the projectile muzzle. This invention is likewise effective, where one or more projectiles emerge simultaneously or within a few microseconds of one another thereby providing interference, to reset the circuit to produce a delayed pulse usable to measure the speed of only the later or interfering projectile. If an interfering projectile emerges during the production of the sweep voltage or the delayed pulse, the initiating pulse is cut off and a new initiating pulse appears to reset the circuit to create a new delayed pulse usable to speed-check the later or interfering projectile. It is therefore a general object of this invention to provide an electronic timing circuit capable of producing a delayed pulse from an initiating pulse, the delayed pulse being produced from limiting, clamping, or clipping the threshold voltage of a linear sweep voltage developed from the initiating pulse to avoid changes in predetermined delay time intervals resulting from changes in circuit constants and supply voltage.

It is another object of this invention to provide a voltage signal of predetermined delay after a projectile emergence signal adapted to switch circuitry to establish projectile speed from Doppler radar signals for a predetermined range of projectile travel from its initial emergence position.

These and other objects, advantages, features, and uses may become more apparent as the description proceeds, illustrating the invention by one of the preferred uses, by reference to the accompanying figure of the drawing showing in schematic block diagram a combination of elements essential in carrying out this invention.

Referring more particularly to the drawing, an input terminal 10 is adapted to receive voltage signals, each such as a Doppler pulse or envelope as represented by a positive waveform or envelope A immediately above the lead connected to terminal 10. The Doppler voltage curve or envelope A is shown as being timed from a time reference point $t_0$ in order that the time relation may be followed through the circuit combination of this invention. The Doppler envelope or pulse A is differentiated in a differentiating circuit 11 to sharpen the leading edge of the Doppler wave A, producing on the output 12 of the differentiating circuit 11 the positive pulse B with respect to $t_0$. The voltage pulse B is applied through an adding circuit 13, coupled through conductor means 14 through a pulse amplifier and inverter circuit 15 and a conductor means 16 to a voltage sweep circuit 17 to produce a linear voltage sweep E on the output 18 of the sweep tube circuit 17. The sweep tube circuit 17 may be of any well known type, one known type capable of producing the voltage sweep E as described being of a Miller sweep tube circuit type, such as that shown and described in the text, "Pulse and Digital Circuits," by Millman and Taub, Section 7–5, 1956, published by McGraw-Hill.

Since the voltage waveform A produced from a Doppler radar or the like may be of irregular envelope form, it is desirable to sharpen the differentiated leading edge of waveform C for triggering the sweep tube circuit 17 to provide high accuracy for the circuit. In order to greatly increase this sensitivity, the sweep voltage E on the output 18 from the sweep tube circuit 17 is fed back by way of conductor means 19 through a differentiating network 20 by conductor means 21 to the adder circuit 13. The regenerative action produced through the feedback circuit to the adding circuit causes a sharply rising voltage at the leading edge of voltage waveform C conducted by conductor means 14 to the pulse amplifier and inverter circuit 15. The pulse amplifier and inverter circuit 15 produces a negative-going pulse D having a sharp leading edge which produces an immediate control grid voltage drop in the voltage sweep tube circuit 17 to produce the sharply rising leading edge on the anode of the voltage sweep tube circuit to create the sharply rising threshold voltage and to initiate the linear sweep voltage E in accordance with the RC constant of the voltage sweep tube circuit 17. Since the Doppler pulse A is positive and the voltage sweep tube circuit is triggered by the negative voltage pulse D, the voltage sweep circuit will produce a voltage sweep wave E having a positive leading edge or threshold voltage and a negative-going sweep voltage, as is well understood of Miller sweep circuits and as shown.

The voltage wave pulse E is applied by way of the conductor means 18 to a threshold limiter 25, which may be a diode circuit or the like or any well known design, that is biased to limit the threshold voltage of the sweep voltage E and thereafter follows the linear voltage E until it "bottoms." For example, the diode acting as a threshold limiter 25 may be coupled to the anode of the voltage sweep tube circuit in the well recognized manner so that when the anode voltage of the sweep tube circuit 17 falls below the diode bias value, the bias diode will follow this voltage drop as shown by the positive voltage waveform G on the output conductor 26 of the threshold limiter 25. As may be seen by the voltage waveform G, the threshold voltage has been clipped or clamped to produce a flat topped portion of the original sweep voltage E to establish a time period $t_1$ delayed from the initial time $t_0$ established by the Doppler pulse A. The voltage sweep G is linearly downward from $t_1$ to a point in time $t_2$ at which it "bottoms." The threshold limiter 25 bias establishes the amplitude of the limited voltage, producing the plateau in the sweep voltage waveform G, thereby establishing the time delay from $t_0$ to $t_1$; that is, the lower the threshold voltage, the greater the time delay between $t_0$ and $t_1$. The slope of the linear sweep may also be modified by changing the circuit constants in the voltage sweep circuit to control the duration of the time $t_1$ to $t_2$.

The sweep voltage waveform G is applied by way of conductor 26 through a differentiating circuit 27 to produce on the output conductor means 28 a voltage waveform H. While the differentiating circuit produces a positive spike adjacent the initial leading edge at time $t_0$, this initial spike is ineffective for utilization in the remainder of the circuit of this invention. At time $t_1$ the differentiating circuit will produce a negative voltage, as shown by the waveform H, which negative voltage will be maintained during the remainder of the negative-going sweep voltage G until the negative-going sweep voltage G "bottoms" at $t_2$, producing a positive-going differentiated voltage at $t_2$, as shown by the waveform H. While the RC constant of the differentiating network 27 is not identified, it is to be understood by those skilled in the art that the differentiated voltage may be maintained constant during the application of the sweep voltage, as fully set out in the above-noted reference of Millman and Taub, Section 2–1 (page 36). The negative square wave voltage H produced by the differentiating network 27 is applied by way of the conductor means 28 to the amplifier 29, thereby amplifying this negative square wave voltage in point of time from $t_1$ to $t_2$ for application to additional controlling circuitry by way of the output conductor means 30. The negative square wave I, applied by way of conductor means 30, may operate, for example, a relay circuit to receive reflected radar signals from projectiles, such as missiles or bullets, in a prearranged time period from $t_1$ to $t_2$ after the emergence of such projectile at a time $t_0$, or it may control a relay circuit for applying intelligence signals to a memory circuit as described in our patent application, Serial No. 784,010, filed December 30, 1958, and entitled "Voltage Information Storage Circuit." In this manner false reflected radar signals after emergence produced by afterblast, comprising a turbulent cloud of burning gases, are eliminated by switching the radar signals on and off during a period after such afterblasts and before the missile or bullet is out of effective radar range. The negative square wave voltage I therefore may be used for operating a relay to trip a radar transmitter and receiver on and off in a time interval in which Doppler radar signals may be produced and used for determining missile or target speed. By the means and method of this invention an optimum time delay after emergence and for an optimum time duration a Doppler radar may be switched to attain radar "sight" during the optimum period of projectile flight for speed measurements, or the Doppler radar intelligence from a projectile may be selected for use.

While this invention has been particularly illustrated and described by referring to its use with Doppler radar in speed measurements of projectiles, it is to be understood that it is not limited to such use or uses and may accomplish desirable results and functions by using any initiating pulse to produce an accurately timed delay pulse without any reliance upon voltage regulation and RC time constants for timing such delay pulses. With the broader scope and use of the invention in mind, applicants desire to be limited only by the scope of the appended claims:

We claim:

1. An electronic timing circuit comprising: a linear sweep voltage generator for generating linear sweep voltages with sharp leading edges upon receiving initiating pulses; means coupled to said generator adapted to apply initiating pulses; means in said last-mentioned coupling consisting of a differentiating and adding network and a feedback circuit from said generator to said adding circuit having a differentiating means therein for differentiating each linear sweep voltage and adding same to the differentiated initiating pulse for producing a prominent leading edge on each initiating pulse; limiting means coupled to said generator for limiting the amplitude of each said linear sweep voltage sharp leading edge thereby delaying the initial start of said linear sweep voltage; differentiating means coupled to said limiting means for differentiating the leading and trailing edges of each limited linear sweep voltage; and means coupled to said differentiating means for amplifying the linear sweep voltage, said differentiated voltage providing a voltage of predetermined duration delayed in time from each initiating pulse.

2. An electronic timing circuit comprising: a voltage sweep tube circuit having an input for receiving initiating pulses and an output for producing linear sweep voltages of adjusted slope; feedback means coupling said input and output through a differentiator and an adder circuit for adding each differentiated linear sweep voltage to the corresponding received initiating pulse to sharpen the leading edge of each initiating pulse thereby increasing the sensitivity of said voltage sweep circuit and for producing a regenerative action in said tube circuit; adjustable limiter means coupled to the output of said tube circuit for adjustably limiting the amplitude of produced sweep voltages causing delay in each linear sweep voltage on the output of said limiter means; and differentiating amplifier means coupled to said limiter means output for differentiating and amplifying a voltage produced from said limited sweep voltage whereby each output voltage is of predetermined duration and delayed a predetermined time from each initiating pulse.

3. An electronic timing circuit for producing delayed relay operating voltage pulses from radar Doppler pulses comprising: a first differentiating network, an adding circuit, an inverting circuit, and a linear sweep voltage generator circuit coupled in that order from an input circuit adapted to apply positive Doppler pulses; a feedback circuit having a second differentiating network therein coupling the output of said linear sweep voltage generator circuit to said adding circuit to produce regenerative action of each input pulse; a threshold limiter coupled to the output of said linear sweep voltage generator for limiting the amplitude of the initial threshold voltage of each linear sweep producing a delay in each linear sweep voltage from the leading edge of the corresponding Doppler pulse applied; and a third differentiator and amplifier combination coupled to the output of said threshold limiter for differentiating each delayed sweep voltage and for amplifying the differentiated voltage providing a delayed voltage pulse adapted to actuate an electrical relay.

4. An electronic timing circuit for producing delayed relay operating voltages pulses from radar Doppler pulses comprising: a first differentiating network, an adding circuit, and a linear sweep voltage generator coupled in that order from an input circuit adapted to apply positive Doppler pulses; a feedback circuit having a second differentiating network therein coupling the output of said linear sweep voltage generator circuit to said adding circuit to produce regenerative action of each input pulse; a threshold limiter coupled to the output of said linear sweep voltage generator for limiting the amplitude of the initial threshold voltage of each linear sweep producing a delay in each linear sweep voltage from the leading edge of the corresponding Doppler pulse applied; and a third differentiator coupled to the output of said threshold limiter for differentiating each delayed sweep voltage, said third differentiator being constructed and arranged to respond to the beginning and ending of each said delayed linear sweep voltage and to maintain a voltage constant during said delayed voltage sweep producing a substantially square voltage wave on the output thereof providing a delayed voltage pulse adapted to actuate an electrical relay.

5. An electronic timing circuit for producing delayed relay operating voltage pulses from radar Doppler pulses comprising: a first differentiating network, an adding circuit, an inverting circuit, and a Miller type sweep voltage generator for producing a negative-going linear sweep voltage initiated by a positive-going leading edge from a Doppler pulse, coupled in that order from an input circuit adapted to apply said Doppler pulses; a feedback circuit having a second differentiating network therein coupling the output of said Miller sweep type voltage generator circuit to said adding circuit to differentiate said positive-going leading edge of each linear sweep voltage for addition to the differentiated voltage from said first differentiating network to produce regenerative action of each input Doppler pulse thereby producing a rapidly rising leading edge of positive voltage; a threshold limiter coupled to the output of said linear sweep voltage generator for limiting the amplitude of the initial threshold voltage of each sweep voltage producing a delay in each sweep voltage from the leading edge of the corresponding Doppler pulse applied; and a third differentiator and amplifier combination coupled to the output of said threshold limiter, said third differentiator being constructed and arranged to respond to the beginning and ending of said delayed sweep voltage and to maintain a voltage constant during said delayed voltage sweep producing a substantially square wave whereby each delayed voltage sweep is shaped to actuate an electrical relay.

References Cited in the file of this patent
UNITED STATES PATENTS

| | | |
|---|---|---|
| 2,438,927 | Labin et al. | Apr. 6, 1948 |
| 2,589,767 | Bess | Mar. 18, 1952 |